Feb. 22, 1966   E. G. LUNDGREN   3,236,125
TOOL HOLDER FOR CHIP CUTTING MACHINING
Filed July 23, 1964                                      2 Sheets-Sheet 1
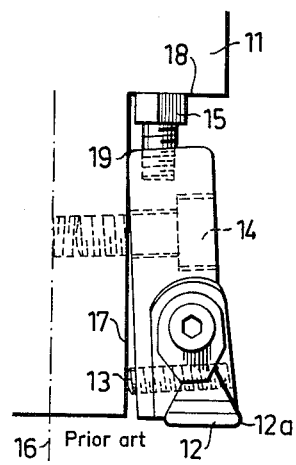
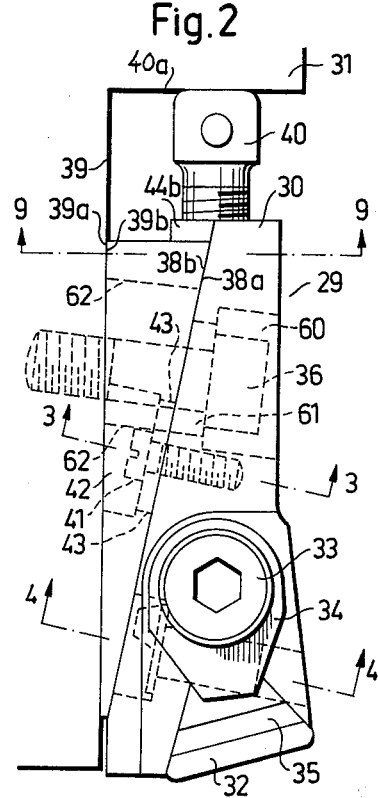

United States Patent Office 3,236,125
Patented Feb. 22, 1966

3,236,125
TOOL HOLDER FOR CHIP CUTTING MACHINING
Evert Gustav Lundgren, Sandviken, Sweden, assignor to Sandvikens Jernverks Aktiebolag, Sandviken, Sweden, a corporation of Sweden
Filed July 23, 1964, Ser. No. 384,669
Claims priority, application Sweden, July 26, 1963, 8,279/63
5 Claims. (Cl. 77—58)

The present invention relates to a tool holder of the so called cartridge type which is mountable in a tooling machine, for instance on the bar of a boring machine. Such holders are used for instance in finishing cylindrical bores in metal bodies. The holder comprises a holder body, a cutting insert mounted thereon and an adjustment device for setting the holder in the desired position on the bar in order to have the proper radius of action of the cutting insert. An essential feature of holders of this kind is that they form a cartridge consisting of the holder body, the insert and the adjustment device, said cartridge being mountable as a unit at a site on the bar.

It is desirable that the holder or cartridge can be set in advance before mounting it on the bar, so that correct radius of action is obtained without further correction of the setting after mounting the holder. In previously known tool holders of the cartridge type the adjustment device has consisted of a setting screw abutting against the bar. This device has been found insufficient for setting in advance, when high accuracy is required. Play in the setting screw, bending of the holder body and deformation of the abutting surface of the bar have made it impossible to make a setting in advance with sufficient accuracy for many purposes. Thus a time consuming and laborious correction of the setting must be performed after the holder has been mounted on the bar, thus causing a long standstill of the machine.

The holder according to the invention presents a solution to the said problem and makes it possible to obtain a high accuracy by setting the holder in advance thus eliminating the final correction of the setting after the mounting of the holder. This is achieved by the aid of an adjustment device in which the setting action is obtained by a wedge shaped support body instead of by the previously used screw. The setting is performed by moving the said wedge shaped body relative to the holder body and since the support surfaces are large and extend along practically the whole holder, the device gives a very firm and reliable support for the holder and is at the same time easy to adjust to the desired position with sufficient accuracy.

Additional details and further advantages of the invention will appear from the following description and the accompanying drawings in which:

FIG. 1 is a side elevational view of a conventional prior art tool holder of the cartridge type.

FIG. 2 is a side elevational view of a tool holder of the cartridge type in accordance with the present invention.

FIG. 3 is a section on line 3—3 of FIG. 2.

FIG. 4 is a section on line 4—4 of FIG. 2.

FIG. 5 is a section on the line 5—5 of FIG. 4.

Figure 6:
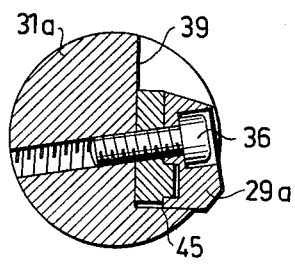
FIG. 6 is a sectional view of a fastening device for holding the holder on a drill bar.

In FIG. 1 is shown a conventional holder of the cartridge type mounted in a seat in a boring bar 11. The holder body 10 is provided with a cutting insert 12 having a radially projecting cutting corner 12a. The holder body 10 is clamped to the bar 11 by a screw 14, and the radial position of the insert 12 in relation to the axis 16 of rotation is adjusted by a screw 13, which runs in threads in the holder body 10 and abuts with one end against the longitudinal support surface 17 on the bar 11. The end of the holder body, remote from the screw 13 rests against the support surface 17 at the point on line 19. The axial position of the holder body 10 can be adjusted by a screw 15, which abuts against a surface 18 on the bar 11.

A holder of this kind has several disadvantages. When the clamping screw 14 is tensioned, the holder body is deflected between the support point 19 and the screw 13, so that the insert is moved radially. The adjustment screw 13 is urged by the clamping screw 14 against the surface 17 with a comparatively great specific surface pressure, so that the surface is deformed. It is possible to avoid this deformation by inserting washers between the screw 13 and the surface 17 but it is obvious that such washers in addition to the play of the screw will lessen the accuracy in case the setting is made in advance. Therefore for high accuracy purposes it will be necessary to perform a final setting after mounting the holder on the bar.

In the holder shown in FIG. 2 these disadvantages are avoided. The holder 29 is attached to a bar 31 in a site formed by a longitudinal surface 39 and a transverse surface 40a. At its lower part, as seen in FIGURE 2, the holder body 30 has a cutting insert 32, preferably of sintered hard metal, sintered oxides or the like, said insert being attached in the usual way by mechanical clamping means consisting of a clamping screw 33 and a clamping plate 34. Between the clamping plate and the cutting insert there is a chip breaker 35, which sometimes can be omitted.

Figure 9:
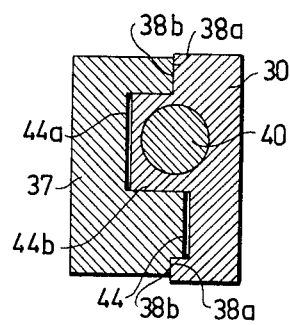
FIG. 9 is a section of the line 9—9 of FIG. 2.

The holder 29 is attached to the bar 31 by means of a screw 36. Between the holder body 30 and the support surface 39 of the bar 31 there is a support body 37, which is shaped as a wedge and is slidable in relation to the holder body 30 along a sliding surface contact formed by a surface 38a on the holder body and a matching surface 38b on the support body 37. The support body 37 rests in the site in the bar 31 with a support surface 39b on the support body in contact with a matching support surface 39a on the bar. The surface 39a is an accurately finished portion of the longitudinal surface 39 of the site for the holder. All surfaces 38a, 38b, 39a and 39b should of course be accurately finished in order to obtain the desired high accuracy of setting of the holder. The surfaces 38b and 39b are at an angle to each other and form the two wedge surfaces of the wedge 37. The rear part of the wedge 37 has a recess 44a into which enters a protruding portion 44b of the holder body 30 (FIGS. 2 and 9), and a longitudinally directed screw 40 enters into the holder body along said protruding portion. This screw 40 abuts against the surface 40a on the bar and can be turned for adjustment of the axial position of the holder.

The surfaces 38a, 38b, 39a and 39b should have such a shape that the necessary relative movement between the abutting parts is permitted. Preferably all of the said surfaces are plane. The surfaces 39a, 39b are often suitably parallel to the axis of rotation but can in certain cases be inclined in relation to said axis for instance in order to alter the position of the insert.

The wedge 37 is held on the holder body 30 by way of a screw 41, the head of which is countersunk into a longitudinal recess 42 in the wedge. The bottom of said recess comprises a longitudinal slit 43 through which the screw passes into the holder body 30. The longitudinal shape of the recess and the slit permits movement of the wedge in relation to the holder body. In order to guide the wedge on the holder body there is a longitudinal ridge portion 44 on the wedge entering into a corresponding slit in the holder body (see FIG. 3). The screw 41 can suitably be given a relatively tight fit in its thread in the holder body for instance by in and per se known means as an elastic insert between the threads. This makes it possible to adjust the screw to a suitable position for permitting sliding of the wedge on the holder body, the screw being maintained in said position by the tight fit.

For moving the wedge there is an eccentric device comprising a stub shaft 50 journalled in a bore in the holder body perpendicularly to the sliding surface 38a. Sections of this device are shown in FIGS. 4 and 5. The shaft 50 is provided with a transverse plate 52 at one end thereof, the plate having a conical lug 53 protruding axially in relation to the stub shaft and entering into a groove 54 situated transversely in the ridge 44, said ridge extending not only within but also beyond the recess 42. The side walls of the groove 54 have the same inclination as the conical lug 53. A spring 55 is positioned coaxially with the stub shaft 50 and exerts pressure on the disc 52. The conical stud 53 is in this way urged by the spring into the matching groove 54 and thus all play between the lug 53 and the groove 54 is eliminated. At the opposite end of the stub shaft 50 there is a key recess 56 for turning the shafts by aid of a key (not shown). When the shaft is turned the lug 53 moves the wedge on the holder body, bringing the level of the support surface 39b closer to or further away from the cutting insert 32.

The screw 36 for holding the holder in the shaft 31 has its head countersunk in a longitudinal recess 60, in the holder body, the screw passing transversely through a longitudinal slit 61 in the holder body and a similar slit 62 in the wedge in order that the holder 29 including the wedge 37 can be adjusted in the axial direction by aid of the screw 40.

It is important that the wedge 37 be self-locking, which means that no sliding should occur under influence of the clamping force from the screw 36. To fulfill this condition it has been found necessary that the inclination of any of the surfaces 39a, 39b and 38a, 38b should not be more than 6° in relation to the axis of the screw 36. It is desirable on the other hand that the wedge angle of the wedge 37 is not too small, as otherwise the radial movement range of the adjustment device would be too small. In order to comply with both of these requirements the screw 36 is not placed normal to the surface 39 but is as shown in FIG. 2 inclined from the said normal by an amount equal to half the wedge angle. In other words the screw is inclined in a plane containing the axis of rotation equally in relation to both surfaces 38b and 39b on the wedge 37. In this way the wedge angle can be twice the self locking angle, i.e. up to 12°.

The holder body 30 and the wedge 37 thereon can be detached from the shaft 31 for setting in a special setting gauge. During the setting of one holder the machine can work with another holder, and thus the capacity of the machine is used to its fullest possible extent, standstills for exchange of the holder being reduced to a minimum.

Because of the relatively small angle of the wedge 37 the setting is very accurate. Both the screw 41 and the spring 55 exert friction forces for maintaining the wedge in the position in which it has been set, so that the accuracy of the setting is maintained during movement of the holder from the setting gauge to the machine and during the fastening of the holder in the bar. The contact surfaces 39a, 39b and 38a, 38b should as above said be thoroughly finished in order to obtain the desired accuracy. These contact surfaces are so large that the specific surface pressure arising in said surfaces under influence of the clamping screw 36 is small enough to avoid any kind of permanent deformation of the contact surface.

A special advantage with the present tool holder is that the setting thereof can be easily adjusted with regard to the tolerance variations in turnable and indexable inserts, which are held by a clamping device. The high setting accuracy of the holder makes it possible to perform machining within tolerance limits which are even narrower than the tolerance limits of the cutting inserts.

Figure 7:
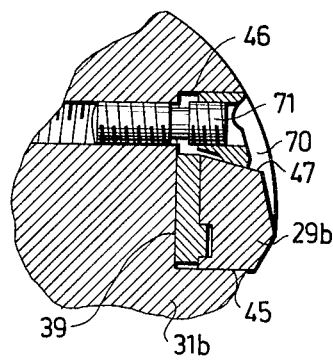
FIG. 7 is another type of fastening device for holding the holder on a drill bar.

FIG. 6 shows a transverse section of a modified holder 29a and a modified shaft or rod 31a. The seat for the holder comprises besides the aforementioned longitudinal support surface 39 also a longitudinal side support surface 45. The clamping screw 36 is placed somewhat askew in relation to the support surface 39 in order to urge the holder towards the side support surface 45. FIG. 7 shows another modification which is useful especially in larger shafts. The holder 29b is placed in a groove in the shaft 31b having a bottom surface 39 as before and two side surfaces 45 and 46. A wedge 70 is placed between the surface 46 and an oblique surface 47 on the holder body, the holder being clamped by the wedge 70 under action of the screw 71.

Figure 8:
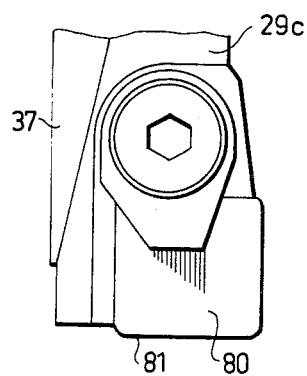
FIG. 8 is a modified detail of the holder of FIG. 2.

In FIG. 2 the insert is triangular, a radially protruding corner being used for the cutting. The insert could alternatively have other known shapes as for instance square shape. For accurate finish sometimes circlular inserts have been found suitable. In FIG. 8 is shown a modified holder 29c of the invention having a square insert 80 positioned with one cutting edge 81 perpendicular to the axis of rotation, said edge generating a plane surface. This embodiment can be used for instance for planing the edge of a bore. In order to obtain a plane surface it is of course important that the cutting edge maintains its right angle position in relation to the rotation axis. In the conventional holder shown in FIG. 1 the angular position of the holder changes when the radial position of the holder is adjusted by aid of the screw 13. This makes it impossible to generate plane surfaces with different settings of the radius of the holder. The holder of the invention provides a substantial improvement in this respect, as the angular position of the holder in relation to the axis of rotation is independent of the position of the wedge and remains the same in different radial positions, thus making it possible to generate plane surfaces independently of the adjustment of the radius.

When in this specification reference is made to the attachment of the holder in a tooling machine it is understood that the holder can be rotated and the work piece stationary or that the holder can be stationary and the work piece rotated. Both cases are equivalent with regard to the working conditions of the tool holder. When reference is made to the mounting of the holder on a bar of a tooling machine as for instance a boring machine, which is the most common case for using a holder of this kind, this reference implies that the holder can be mounted on some other machine element which does not necessarily have the shape of a bar.

I claim:

1. A tool holder of the cartridge type comprising a holder body, a cutting insert detachably secured to said holder body, said holder body having a substantially plane surface, a wedge shaped support body having two substantially plane surfaces one of which is in contact with said plane surface of said holder body and the other of which is adapted to engage a substantially plane support surface on a bar of a tooling machine, means for securing said holder to said bar and means for adjusting said wedge shaped support body relative to said holder body to vary the distance between the last named surface of said wedge shaped support body and the cutting insert comprising a shaft rotatably mounted on said holder body, an eccentric lug on the end of said shaft extending beyond said substantially plane surface of said holder body and a groove in the substantially plane surface of said wedge shaped support body adjacent to said holder body, said lug extending into said groove.

2. A tool holder as defined in claim 1 in which said lug has a conical surface and the side surfaces of said groove are inclined at the same angle as the surface of said lug, said holder comprising a spring tensioned to hold said lug in said groove.

3. A tool holder of the cartridge type comprising a holder body, a cutting insert detachably secured to said holder body, said holder body having a substantially plane surface, a wedge shaped support body having two substantially plane surfaces one of which is in contact with said plane surface of said holder body and the other of which is adapted to engage a substantially plane support surface on a bar of a tooling machine, means for securing said holder to said bar and means for adjusting said wedge shaped support body relative to said holder body to vary the distance between the last named surface of said wedge shaped support body and the cutting insert, said means for securing the holder to the bar of a tooling machine comprising a screw extending through said holder body and said wedge shaped support body and adapted to extend into a screw threaded hole in said bar, the axis of said screw being at equal angles to both plane surfaces of said wedge shaped support body measured in the direction of the axis of rotation of said holder.

4. A tool holder of the cartridge type comprising a holder body, a cutting insert detachably secured to said holder body, said holder body having a substantially plane surface, a wedge shaped support body having two substantially plane surfaces one of which is in contact with said plane surface of said holder body and the other of which is adapted to engage a substantially plane surface on a bar of a tooling machine, means for securing said holder to said bar, separate means for securing said support body to said holder body, and means for adjusting said support body relative to said holder body to vary the distance between the last named surface of said support body and the cutting insert.

5. A tool holder as defined in claim 4 in which one plane surface of said holder body and said plane surface of said support body in contact therewith are provided with a longitudinal ridge and a matching groove, said ridge extending into said groove whereby lateral relative movement of said holder body and said support body is prevented.

References Cited by the Examiner

UNITED STATES PATENTS

| | | |
|---|---|---|
| 2,495,291 | 1/1950 | Schlitters. |
| 2,590,068 | 3/1952 | Pekrul. |
| 3,121,939 | 2/1964 | Williams _____ 29—105 X |
| 3,189,976 | 6/1965 | Pickril _____ 77—58 X |

FOREIGN PATENTS 391,980   5/1933   Great Britain.

WILLIAM W. DYER, Jr., *Primary Examiner.*

G. A. DOST, *Assistant Examiner.*